United States Patent
Gheen et al.

(10) Patent No.: US 11,734,763 B1
(45) Date of Patent: Aug. 22, 2023

(54) IMPLEMENTING A HARDWARE RESOURCE CLASS

(71) Applicant: Baseline Growth Capital, LLC, Monument, CO (US)

(72) Inventors: Joel Gheen, Monument, CO (US); Raghav Mathur, Denver, CO (US)

(73) Assignee: BASELINE GROWTH CAPITAL, LLC, Monument, CO (US)

( * ) Notice: Subject to any disclaimer, the term of this patent is extended or adjusted under 35 U.S.C. 154(b) by 170 days.

(21) Appl. No.: 17/130,091

(22) Filed: Dec. 22, 2020

Related U.S. Application Data (60) Provisional application No. 62/957,893, filed on Jan. 7, 2020.

(51) Int. Cl.
*G06Q 40/06* (2012.01)
*G06N 20/00* (2019.01)
*G06Q 10/04* (2023.01)
*G06Q 30/0201* (2023.01)

(52) U.S. Cl.
CPC ............ *G06Q 40/06* (2013.01); *G06N 20/00* (2019.01); *G06Q 10/04* (2013.01); *G06Q 30/0206* (2013.01)

(58) Field of Classification Search
None
See application file for complete search history.

(56) References Cited

U.S. PATENT DOCUMENTS

| 8,489,491 | B2 * | 7/2013 | Gulati | G06Q 40/06 705/37 |
| 8,589,549 | B1 * | 11/2013 | Vermeulen | G06F 9/50 709/226 |
| 2018/0060127 | A1 * | 3/2018 | Esterkin | G06F 9/5011 |
| 2020/0065759 | A1 * | 2/2020 | McNamara | G06Q 10/0635 |

FOREIGN PATENT DOCUMENTS

WO WO-2020041981 A1 * 3/2020 ............. G06F 16/27

OTHER PUBLICATIONS

WO-2020041981-A1 machine translation (Year: 2020).*

* cited by examiner

*Primary Examiner* — Paul S Schwarzenberg
(74) *Attorney, Agent, or Firm* — Michael Best & Friedrich LLP (57) ABSTRACT

A system, method, and computer-readable medium for implementing a hardware resource class. An electronic processor may be configured to determine a rate of a hardware resource. The hardware resource may be configured to allow a hardware-based solution provider to provide a service to an end user. The rate may be configured to be remunerated by a source different than the end user. The electronic processor may be further configured to determine an inflow amount for the hardware-based solution provider to remunerate to the source based at least partially on the rate of the hardware resource. The end user may utilize the service from the hardware-based solution provider. The service from the hardware-based solution provider may be at least partially based on data provided by the hardware resource.

18 Claims, 8 Drawing Sheets

IMPLEMENTING A HARDWARE RESOURCE CLASS

RELATED APPLICATIONS

This application claims priority to U.S. Provisional Application No. 62/957,893, filed on Jan. 7, 2020, the entire contents of which are hereby incorporated by reference.

SUMMARY

Computer hardware and hardware integral to implementing technology solutions including, for example, sensors, telematics hardware, microchips, transmitters/receivers, and the like (referred to herein as hardware) are increasingly critical components of integrated technology solutions. However, because of the capital burden of hardware purchases (i.e., hardware remunerations), hardware-based solution providers who are selling these integrated technology solutions (sometimes referred to herein as hardware companies, which may include software companies requiring expensive hardware to implement their software products) have broadly required end-users or customers (for example, oil & gas companies, retail companies, hospitals, and the like) to purchase (i.e., remunerate) hardware up front. With a few exceptions, hardware remains relatively expensive and hardware sales are relatively slow due to the onerous capital requirements of manufacturing, configuring, and deploying hardware components for a given integrated solution. Consequently, software companies, which do not have hardware-based solutions, receive more private capital investment and higher valuations than hardware companies.

Hardware companies (and software companies requiring expensive hardware to implement their software products) are stymied by the expense of hardware: the marginal cost of implementing a solution is equal to or greater than the fully-burdened cost of acquiring and deploying one or more additional hardware units. There are currently no appropriately-aligned capital sources to ease the burden of purchasing hardware without applying onerous pressure (i.e. debt) to either the hardware company supplying the integrated solution or the end-user of the solution who is directly using the hardware.

Therefore, embodiments herein describe, among other things, a system, method and computer-readable medium for the implementation of a hardware resource class (i.e., a hardware asset class). More generally, the hardware asset class can be used to invest in hardware-based solution providers that provide a solution which requires some type of hardware to be utilized.

The hardware asset class allows an investor (a hardware investor, which also may be referred to as a source) to supply capital to the hardware-based solution providers by directly purchasing hardware (i.e., a hardware asset/resource) from them for the purpose of deploying the hardware to an end-user (a customer of the hardware-based solution provider) in an integrated technology solution so that the end user is no longer burdened with the up-front cost of the hardware. In return, the hardware investor (i.e., source) collects a royalty from the hardware-specific revenue as the hardware-based solution provider collects recurring revenue from the end-user. Rather than an investors buying equity or lending capital as in traditional asset classes, the hardware asset class allows for a systematic, recurring, scalable solution for generating hardware joint-ventures between an investor and a hardware-based solution provider, in which royalty mechanisms are employed to generate systematic liquidity to investors. Due to the royalty-style liquidity provided by the hardware asset class, the hardware asset class allows investors to manage their investment portfolios by modulating exposure based on systematic purchases of hardware units.

One embodiment includes an electronic computing device for implementing a hardware resource class. The electronic computing device may include an electronic processor that may be configured to determine a rate of a hardware resource. The hardware resource may be configured to allow a hardware-based solution provider to provide a service to an end user. The rate may be configured to be remunerated by a source different than the end user. The electronic processor may be further configured to determine an inflow amount for the hardware-based solution provider to remunerate to the source based at least partially on the rate of the hardware resource. The end user may utilize the service from the hardware-based solution provider. The service from the hardware-based solution provider may be at least partially based on data provided by the hardware resource.

Another embodiment includes a method for implementing a hardware resource class. The method may include determining, with an electronic processor, a rate of a hardware resource. The hardware resource may be configured to allow a hardware-based solution provider to provide a service to an end user. The rate may be configured to be remunerated by a source different than the end user. The method may further include determining, with the electronic processor, an inflow amount for the hardware-based solution provider to remunerate to the source based at least partially on the rate of the hardware resource. The end user may utilize the service from the hardware-based solution provider. The service from the hardware-based solution provider may be at least partially based on data provided by the hardware resource.

DETAILED DESCRIPTION OF THE EMBODIMENTS

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1A:
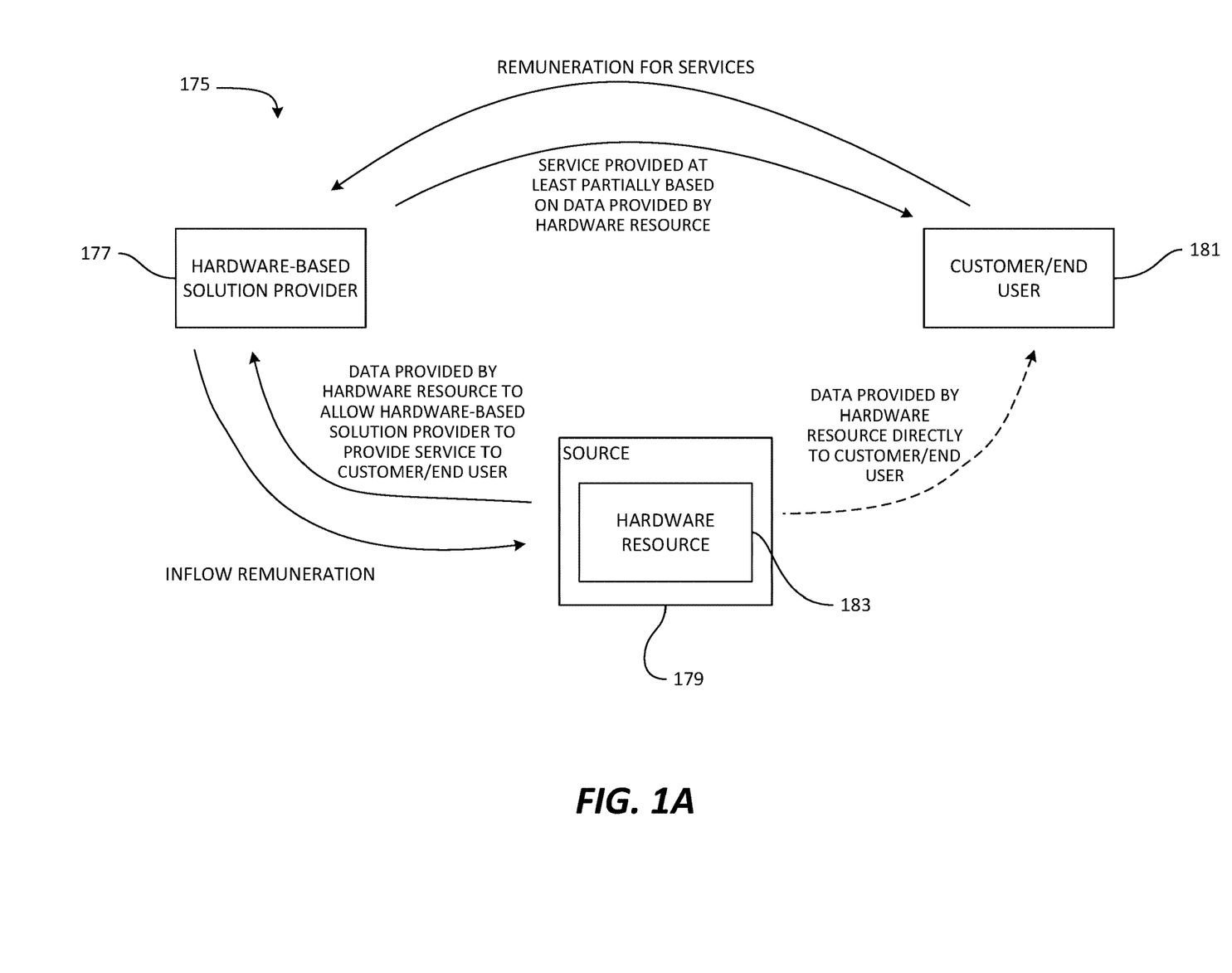
FIG. 1A is a block diagram of entities that may participate in the implementation of a hardware resource class.

FIG. 1A is a block diagram 175 of entities that may participate in the implementation of a hardware resource class (i.e., a hardware asset class). The hardware asset class may be a hardware grouping of investments that exhibit similar characteristics, behave similarly to one another in the market place, and are subject to the same laws and regulations. As shown in FIG. 1A, the entities involved in the implementation of the hardware asset class may include a hardware-based solution provider 177, an investor 179 (i.e., source), and a customer/end user 181. As explained previously herein, in some embodiments, the hardware asset class is implemented to allow the investor 810 to supply capital (e.g., money) to the hardware-based solution provider 177 by directly purchasing (i.e., remunerating) a hardware resource 183 (i.e., a hardware asset) from the hardware-based solution provider 177 for the purpose of deploying the hardware resource 183 to an end user 181 (e.g., a customer 181 of the hardware-based solution provider 177) in an integrated technology solution so that the end user 181 is not burdened with the up-front cost of the hardware resource 183. In return, the investor 810 (i.e., hardware investor 810) collects a royalty payment (i.e., inflow) from revenue generated by the hardware-based solution provider 177 based on the hardware resource 183 owned by the investor 810 (i.e., hardware-specific revenue) as the hardware-based solution provider 177 collects recurring revenue from the end-user 181 (i.e., payment/remuneration for a service provided by the hardware-based solution provider 177 and/or provided by the hardware resource 183).

For example, the hardware resource 183 may be a security camera or a security camera system including a plurality of security cameras. The end user 181 may be a store (e.g., a retail establishment with a physical location that sells items to the public) that desires to obtain a security camera system and/or that desires to obtain security camera footage from a nearby security camera (e.g., a traffic camera, a security camera of a second store across the street that may include an entrance to the first store in its field of view, etc.). However, the store may not be able to afford to have a security camera system installed (e.g., due to high costs associated with hardware and hardware installation as explained previously herein). Additionally, the store may not be able to acquire the security camera footage from the nearby security camera.

To address this problem, the investor 810 may purchase the hardware resource 183 (i.e., the security camera system) from the hardware-based solution provider 177. The hardware resource 183 may then be installed in the store for use by the end user 181. In some embodiments, installation costs are included in the purchase price (i.e., rate) of the hardware resource 183. Once installed, the security camera system may be maintained by the hardware-based solution provider 177 to allow the hardware-based solution provider 177 to provide a service to the end user 181. For example, the security camera system may upload captured images/video to a server system or cloud computing device maintained by the hardware-based solution provider 177. Through, for example, a website or a smart phone application, the end user 181 may access the captured images/video and/or receive alerts in response to certain events being recognized in captured images/video. In exchange for the services provided by the hardware-based solution provider 177 via the website or smart phone application, the end user 181 may pay (i.e., remunerate), for example, a monthly payment to the hardware-based solution provider 177. This monthly payment for services may be significantly less than the up-front cost of purchasing and installing the security camera system, which makes the security camera system more affordable to the end user 181. Additionally, the hardware-based solution provider 177 provides a royalty payment to the investor 179 to allow the investor 179 to gradually recoup the purchase price of the security camera system. FIG. 1A illustrates the flow of payments (i.e., remunerations) and services between different entities participating in the implementation of the hardware asset class.

In FIG. 1A, the hardware resource 183 is shown as being owned by the investor 179. However, the hardware resource 183 may be located on the property of the end user 181 and may be used by the end user 181 as explained in the above example. As another example, the second store across the street from the first store may act as an investor 179 for a security camera (i.e., hardware resource 183) that the second store owns. For example, the second store may choose to engage in hardware asset class investment by making images/video captured by their outdoor security camera available to other entities for viewing through an interface maintained by the hardware-based solution provider 177. For example, the end user 181 (i.e., the first store) may pay a monthly payment to the hardware-based solution provider 177 to be able to view footage captured by the outdoor security camera of the second store. In turn, the hardware-based solution provider 177 may provide royalty payments to the second store based on how often the footage from the security camera of the second store is viewed or used to generate alerts for other entities such as the first store. Alternatively, the hardware-based solution provider 177 may provide royalty payments to the second store as a percentage of the monthly payments paid (i.e., remunerated) by the first store.

As indicated in FIG. 1A, in some embodiments, the hardware resource 183 (e.g., a security camera) may optionally provide data directly to the end user 181 without the data being provided through the service maintained by the hardware-based solution provider 177. For example, when the hardware resource 183 is a security camera, the security camera may have a local memory that includes a circular buffer that stores the last sixty minutes of video footage that can be locally viewed by the end user 181. However, because the circular buffer is constantly overwritten by newly-received video footage, before overwriting occurs, the security camera uploads video footage to the server system or cloud computing device maintained by the hardware-based solution provider 177 for more permanent storage. Thus, the end user 181 may be able to view the most recently captured video footage without using a service provided by the hardware-based solution provider 177. However, to view less recently captured video footage, the end user 181 may need to use the service provided by the hardware-based solution provider 177.

Although only one of each of the hardware-based solution provider 177, the investor 179, the end user 181, and the hardware resource 183 is shown in FIG. 1A, the implementation of the hardware asset class may include additional entities 177, 179, 181 and additional hardware resources 183. For example, an investor 179 may purchase any number of hardware resources 183 to be used by one or more end users 181. As another example, a plurality of hardware-based solution providers 177 may each provide services to one or more end users 181 where such services require the use of one or more hardware resources 183 that may be too expensive for some end users 181 to outright purchase up-front.

Figure 1B:
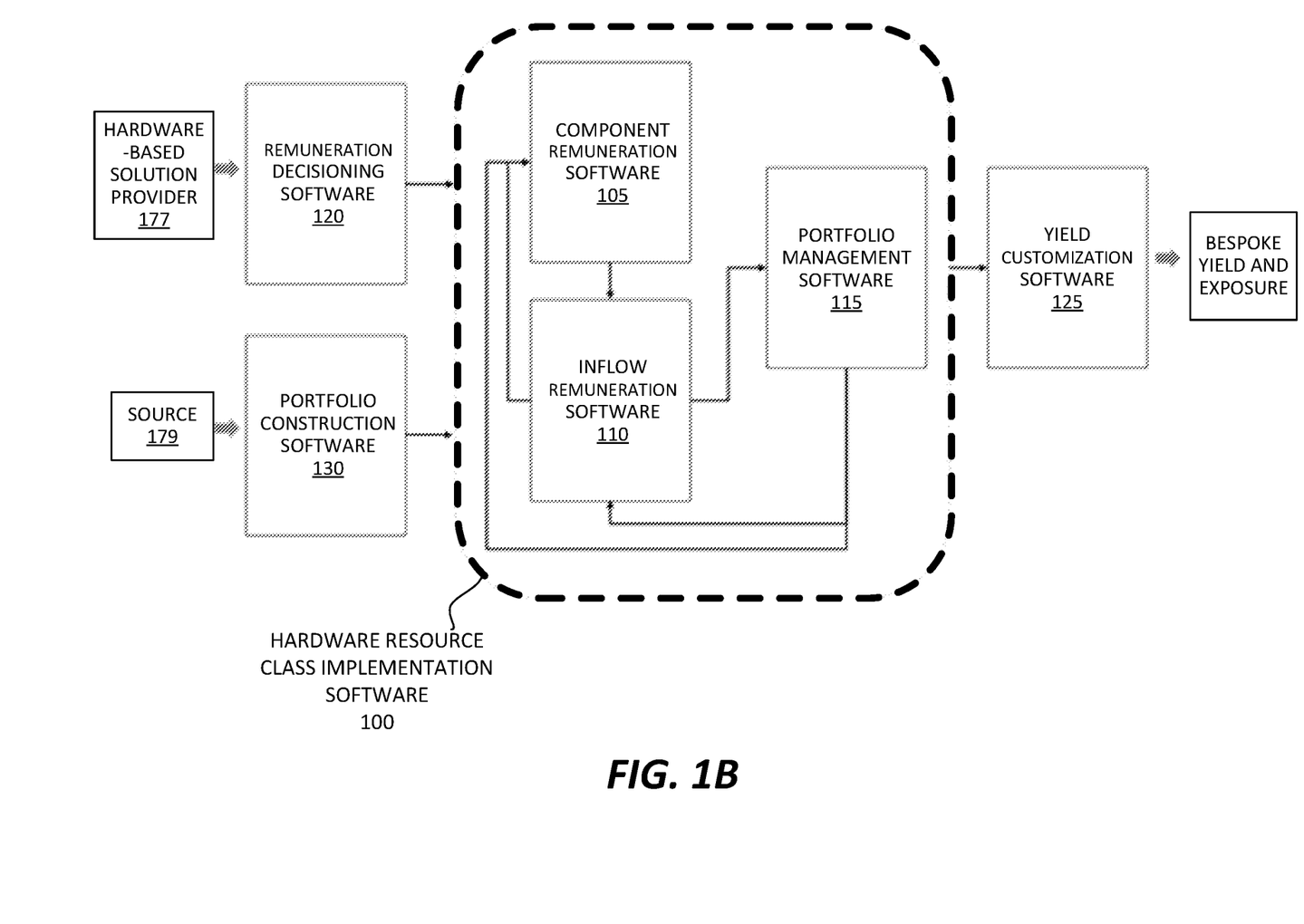
FIG. 1B is a graphical illustration of hardware resource class implementation software that includes software components that make calculations with respect to the hardware resource class.

FIG. 1B is a graphical illustration of hardware resource class implementation software 100 (i.e., hardware asset class implementation software) that includes software components that make calculations with respect to a hardware resource class (i.e., hardware asset class). The calculations are relevant to one or more entities involved in purchasing, selling, and/or managing one or more hardware resources 183 included in the hardware asset class. The hardware asset class implementation software 100, when executed by an electronic processor (e.g., electronic processor 605 shown in FIG. 7), determines a price (i.e., a rate) for a hardware resource 183 being purchased by an investor 179 and a royalty (e.g., a fixed monthly amount) to be collected from a hardware-based solution provider 177 that provides a service to a customer/end user 181 using the purchased hardware resource 183. In some instances, the hardware-based solution provider 177 that provides the service to the end user 181 using the purchased hardware resource 183 may also be the entity that sold the hardware resource 183 to the investor 179.

In the illustrated embodiment, software components included in the hardware asset class implementation software 100 include component remuneration software 105 (i.e., component pricing software), inflow remuneration software 110 (i.e., royalty pricing software), and portfolio management software 115 (i.e., portfolio risk management software). These software components interact with one another to perform the functionality of the hardware asset class implementation software 100. Each of the component pricing software 105, royalty pricing software 110, and portfolio management software 115 will be described in further detail below and illustrated in the associated drawings.

The remuneration decisioning software 120 (i.e., investment/purchase decisioning software), yield customization software 125, and the portfolio construction software 130 utilize the hardware asset class implementation software 100 to develop an investment portfolio, for example, to make recommendations to the investor 179 and/or a portfolio manager related to purchasing (i.e., remunerating) and/or selling (i.e., removing from the portfolio) hardware resources 183 of different types and quantities.

Figure 2:
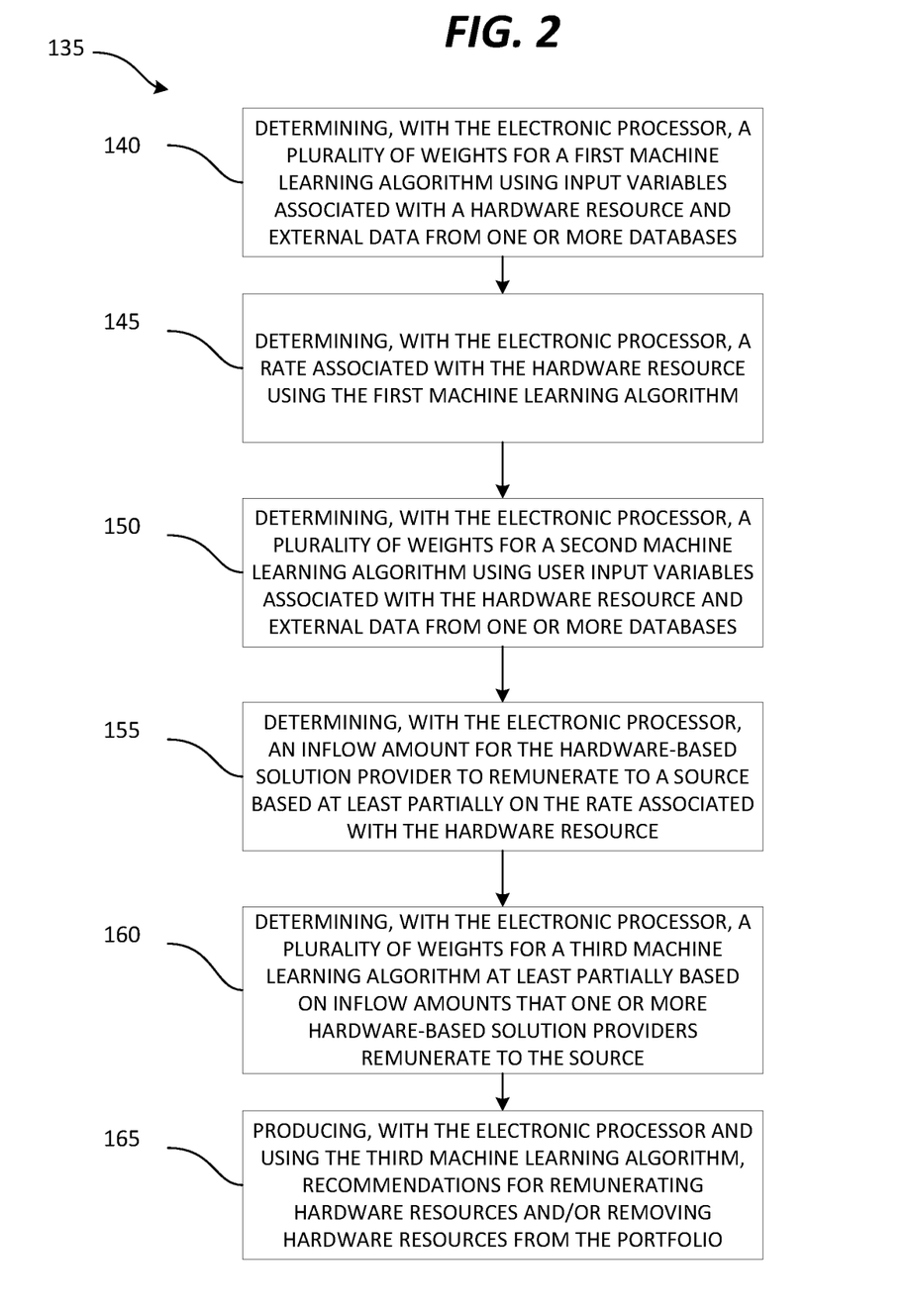
FIG. 2 is a flowchart of an example method for implementing the hardware resource class according to some embodiments.

FIG. 2 is a flowchart of an example method 135 for implementing the hardware asset class. FIG. 2 is referred to in the discussion of FIGS. 3-5 below.

Figure 3:
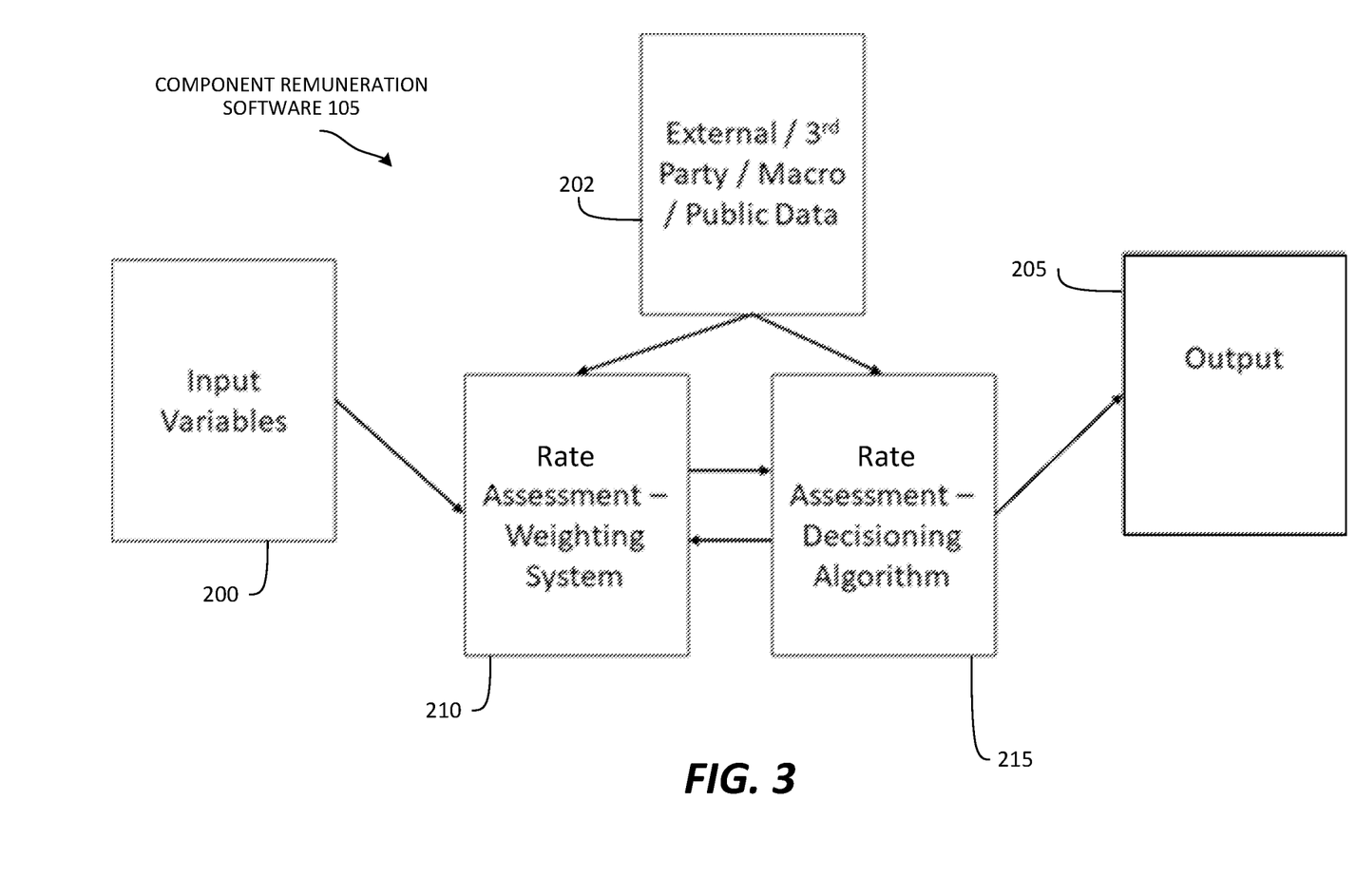
FIG. 3 is an example illustration of the component pricing software of FIG. 1B in accordance with some embodiments.

FIG. 3 is an illustration of the component pricing software 105 showing input variables 200 and external data 202 received by the component pricing software 105, outputs 205 that the component pricing software 105 generates when executed, and a rate assessment—weighting system 210 (i.e., pricing risk assessment—weighting system) and a rate assessment—decisioning algorithm 215 (i.e., pricing risk assessment—decisioning algorithm) that are configured to generate the outputs 205 based on the inputs variables 200 and/or based on the external data 202. The component pricing software 105 may be configured to generate pricing estimates for a particular hardware resource 183, for example, over time and by volume based on a number of units purchased. For example, the pricing estimate may indicate an outright purchase price of the hardware resource 183 (e.g., for purchase by the investor 179).

The input variables 200 may include data associated with raw material and the manufacturing of the raw material to create the hardware resource 183 (for example, costs and types or models), sourcing geographies for raw material and manufactured hardware components, labor costs, shipping and handling costs, volume pricing discounts (if any are applicable), after market and secondary market maturity (e.g., the re-sale value of the hardware resource 183), residual value estimation (the expected useful lifetime of the hardware resource 183 based on the age and usage of the hardware resource 183), continuing expenses (for example, installation expenses, maintenance expenses, and other ongoing total cost of ownership expenses), manufacturing time that may be indicative of time between receiving an order and receiving payment for the order, and the like.

The external data 202 may include macro-economic inputs (factors, such as the geo-political climate that can influence the manufacturing costs of hardware resource 183), industry specific inputs (industry specific factors that can influence the manufacturing costs of hardware resource 183, for example, whether customers in one industry are less likely to pay their bills or whether a resource used in manufacturing is becoming depleted or more expensive), and the like. The external data 202 may also include inputs related to end users 181 expected to use the services provided at least partially by the hardware resource 183. For example, the external data 202 may include information related to trends in usage of services associated with the hardware resource 183 over the past month, six months, year, etc. (e.g., whether usage of such services is increasing or decreasing).

As indicated by the above examples, in some embodiments, the input variables 200 may relate to a specific hardware resource 183 being analyzed by the component pricing software 105 while the external data 202 may relate more generally to hardware resources 183 that are similar in type and/or function to the hardware resource 183 being analyzed by the component pricing software 105. In some embodiments, the input variables 200 and the external data 202 are entered into the component pricing software 105 by a user via a user input device (e.g., a keyboard, touch screen, etc.), retrieved by the component pricing software 105 from one or more databases, or both.

The outputs 205 may include a schedule of pricing of the hardware resource 183 by hardware model or profile, by volume of hardware resources 183 purchased, by time or maturity of the company producing the hardware resource 183, or the like. The schedule of hardware resource pricing includes, for example, the predicted price of a hardware resource 183 in a month, in six months, in a year, a combination of the foregoing, and the like. The schedule of hardware resource pricing may also include, for example, the predicted price of a hardware resource 183 when buying, for example, zero to ten units, eleven to twenty units, twenty-one to thirty units, a combination of the foregoing, and the like.

In some embodiments, the component pricing software 105 uses a weighted calculation to determine the schedule of hardware resource pricing (i.e., the output 205). The weights may be determined and adjusted in real-time and based on the input variables 200 and/or the external data 202 by the pricing risk assessment—weighting system 210 (at step 140 of FIG. 2). For example, the weights may be determined and adjusted based on factors intrinsic (user input) and extrinsic (input from one or more databases) to the entity manufacturing and/or selling the hardware resource 183, entities purchasing the hardware resource 183, and entities that are end users 181 of a service provided at least partially by the hardware resource 183. In one example, when there is civil unrest in an area where a hardware resource 183 is manufactured, the determined schedule of hardware component pricing (i.e., output 205) may indicate that the price of the hardware resource 183 is expected to increase over time in the near future due to the uncertainty caused by the civil unrest of the area.

In some embodiments, the pricing risk assessment—decisioning algorithm 215 utilizes a first machine learning algorithm with the input variables 200, the external data 202, and the associated weights generated by the pricing risk assessment—weighting system 210 to generate the output 205 (step 145 of FIG. 2), for example, based on previously-received training data. Although blocks 210 and 215 are shown separately in FIG. 3, in some embodiments, the machine learning algorithm implemented by the electronic processor 605 performs the functionality of both blocks 210 and 215.

As one example of the component pricing software 105 determining a schedule of asset pricing (i.e., the output 205), the hardware resource 183 may be a smart camera used primarily by end users 181 in the United States. The United States government may impose new tariffs and/or restrictions on hardware components sourced from manufacturers overseas in a particular geography that is involved in the assembly/manufacture of the smart camera. These new tariffs and/or restrictions may result in increased materials costs for a particular component of the smart camera (e.g., a chip-set or printed circuit board). For example, cost of manufacturing and/or shipping the smart camera may increase from paying the new tariff or from sourcing the hardware components within the United States instead of from overseas. Such costs (e.g., a 15% increase in costs for the hardware component) may be expected to remain increased for a certain period of time until the tariffs and/or restrictions are expected to be lifted or until the U.S. manufacturing cost is expected to be reduced due to, for example, additional manufacturing facilities being established.

Continuing the above example, the pricing risk assessment—weighting system 210 may determine that the hardware components experiencing the increase in cost is a "critical" component of the smart camera that cannot be substituted with a different, lower cost component. Additionally, the pricing risk assessment—weighting system 210 may determine that the cost of the hardware component is 30% of the total cost of the smart camera. Given the criticality of the hardware component and the percentage of the total cost of the hardware component with respect to the smart camera, the pricing risk assessment—weighting system 210 may determine that the pricing risk of the new tariffs and/or regulations to the price of the smart camera is "high" or, for example, a seven out of ten. In other words, external data 202 (i.e., the new tariffs and/or regulations) are likely to significantly affect the cost of manufacturing the smart camera for the next 12-24 months.

Given the determined "high" pricing risk of the new tariffs and/or regulations with respect to the price of the smart camera, the pricing risk assessment—decisioning algorithm 215 determines that the impact to the total cost of the smart camera is significant enough for the previous purchase price of the smart camera to be increased. For example, the pricing risk assessment—decisioning algorithm 215 may determine that the purchase price of the smart camera should be increased proportionately with the increase in cost of manufacturing. As an alternative to this example, if the pricing risk of the new tariffs and/or regulations with respect to the price of the smart camera is determined by the pricing risk assessment—weighting system 210 to have a low risk (e.g., a low risk or a three out of ten), the pricing risk assessment—decisioning algorithm 215 may determine that no change to the previous purchase price of the hardware resource 183 is necessary or that a smaller increase in purchase price is warranted. For example, if the price of the hardware component only made up 10% of the total cost of the smart camera instead of 30% or if the cost of the hardware component increased by 3% instead of 15%, the pricing risk assessment—decisioning algorithm 215 may determine that no change to the previous purchase price of the hardware resource 183 is necessary or that a smaller increase in purchase price is warranted. In such situations, the gross margins from the sales of the smart cameras may be sufficient to absorb a small price increase of the hardware component while still allowing the hardware-based manufacturer 177 to make profits while maintaining or only minimally reducing a royalty payment received by the investor 179 from the hardware-based manufacturer 177. In some embodiments, the gross margins and other related data may be another input received by component pricing software 105 (from the royalty pricing software 110) as indicated in FIG. 1B.

Figure 4:
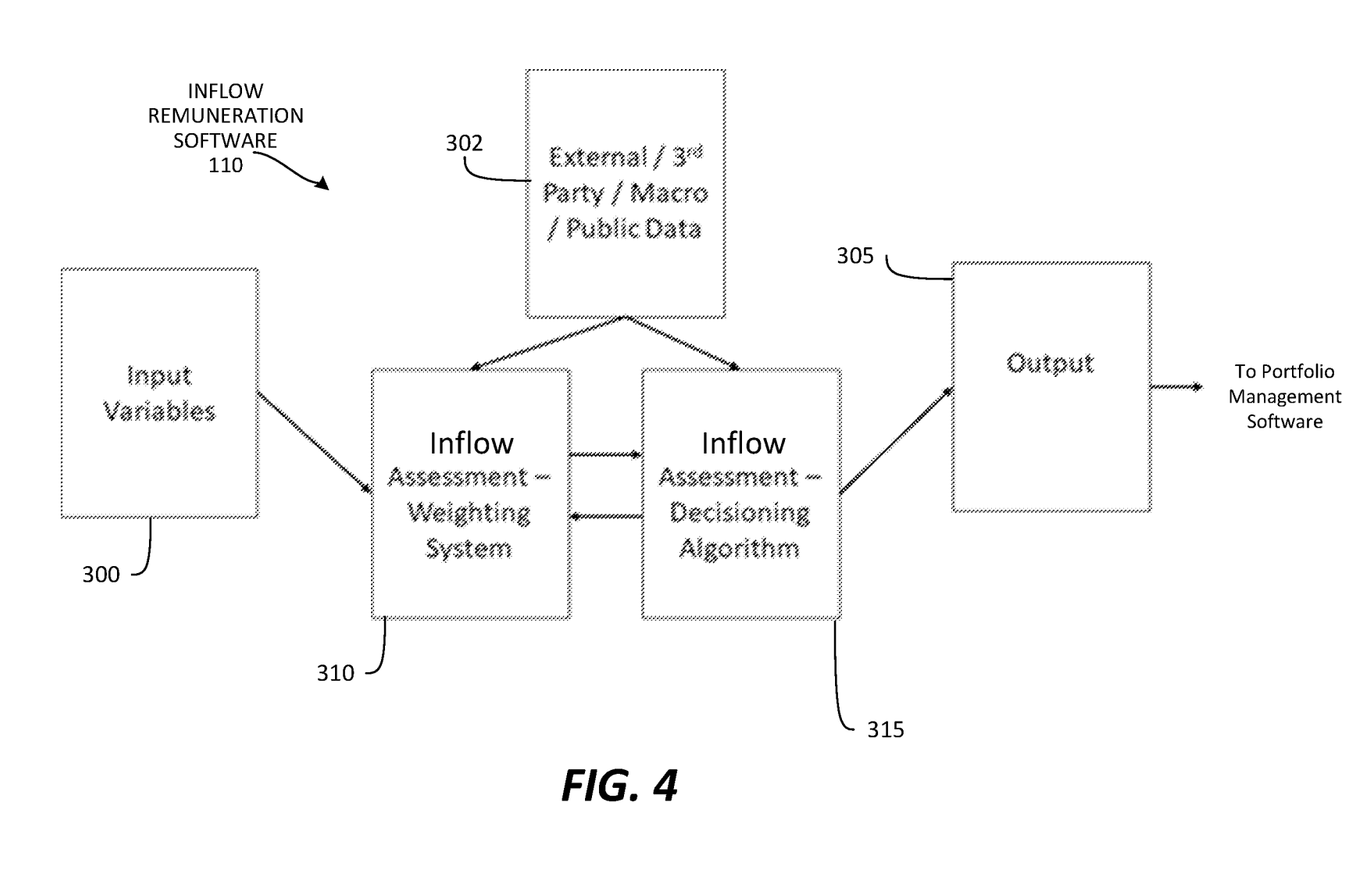
FIG. 4 is an example illustration of the royalty pricing software of FIG. 1B in accordance with some embodiments.

In some embodiments, the component pricing software 105 is configured to compare the output 205 with the output from the output of the royalty pricing software 110 (described in further detail below). The component pricing software 105 may adjust the weights generated by the pricing risk assessment—weighting system 210 based on a royalty pricing output from the royalty pricing software 110 to change the component pricing to adjust the revenue received by an investor 179 and/or the profits received by the hardware-based solution provider 177.

FIG. 4 is an illustration of the royalty pricing software 110 showing input variables 300 and external data 302 received by the royalty pricing software 110, outputs 305 the royalty pricing software 110 generates when executed by an electronic processor 605, and an inflow assessment—weighting system 310 (i.e., royalty risk assessment—weighting system) and an inflow assessment—decisioning algorithm 315 (i.e., royalty risk assessment—decisioning algorithm) that are configured to generate the outputs 305 based on the input variables 300 and/or based on the external data 302. The royalty pricing software 110 may be configured to generate royalty payment estimates (i.e., inflow estimates) for a particular hardware resource 183. For example, the royalty payment estimate may indicate an amount of money that is to be received (or likely to be received) on a periodic basis (e.g., monthly) from the hardware-based solution provider 177 by an investor 179 who has purchased the hardware resource 183 to allow the hardware-based solution provider 177 to provide a service to one or more end users 181.

The input variables 300 may include a type of industry in which the hardware resource 183 is used by the end users 181, a type of contract in which the end user 181 engages to receive services at least partially provided by the hardware resource 183, a life expectancy of the hardware resource 183, a total cost of ownership of the hardware resource 183 (e.g., estimated maintenance and repair costs, etc.), a competitive landscape related to the hardware resource 183 (e.g., market share of a particular hardware-based solution provider 177, how many similar hardware resources 183 of competitors exist, etc.), financial information of the hardware-based solution provider 177 (e.g., revenue; earnings before interest, tax, depreciation and amortization (EBITDA), net profit trajectory, gross margins, debts or other commitments, cash reserves and balance sheet positions, etc.), a stage of the hardware-based solution provider (for example, a start-up company, established company for over ten years, a Fortune 500 company, or the like), a customer churn rate for the hardware-based solution provider 177, a failure rate of the hardware resource 183, an idle rate of the hardware resource 183, cohort size(s) (a cohort is a group of hardware components purchased together as a unit), obsolescence expectations of the hardware resource 183 (i.e., when the hardware resource 183 is expected to become obsolete in the future), estimated intellectual property value of the hardware resource 183 (e.g., whether a patent has been obtained that covers the hardware resource 183), a combination of the foregoing, and the like.

In some embodiments, the external data 302 is the same as or similar to the external data 202 explained previously herein with respect to FIG. 3. For example, the external data 302 includes industry specific inputs (e.g., industry specific factors that can influence the monetary amount of the royalty payments of the hardware resource 183, for example, whether customers in one industry are less likely to pay their bills) and the like. In some embodiments, at least some of the input variables 300 are the same as or similar to the input variables 200 explained previously herein with respect to FIG. 3.

The outputs 305 may include a recovery time that it will take an investor 179 to recover the capital (i.e., money) provided to the hardware-based solution provider 177 to purchase the hardware resource 183, a royalty payment amount (e.g., an amount of money that the investor 179 may expect to periodically receive (e.g., monthly) from the hardware-based solution provider 177, which also may be referred to as an inflow amount), a pacing of follow-on investments (e.g., a rate to lend future capital to the hardware-based solution provider 177 based at least partially on the amount of capital already invested and the amount of royalty payments being received), a combination of the foregoing, and the like.

In some embodiments, the royalty pricing software 110 uses a weighted calculation to determine a royalty payment schedule, future investment recommendations, a combination thereof, or the like. The weights may be determined and adjusted in real-time and based on the input variables 300 and the external data 302 by the royalty risk assessment—weighting system 310 (step 150 of FIG. 2). For example, the weights may be determined and adjusted based on factors intrinsic (user input) and extrinsic (input from one or more databases) to the entity manufacturing and/or selling the hardware resource 183, entities purchasing the hardware resource 183, and entities that are end users 181 of a service provided at least partially by the hardware resource 183. In one example, when the hardware-based solution provider 177 is a new startup company the weighting may be adjusted so that recovering capital invested in a hardware resource 183 utilized by the hardware-based solution provider 177 is prioritized. In other words, the royalty risk assessment—weighting system 310 may weight quick return on investment from the hardware-based solution provider 177 more heavily when the hardware-based solution provider 177 is a startup company than when the hardware-based solution provider 177 is a more well-established companies such as a Fortune 500 company.

In some embodiments, the royalty risk assessment—decisioning algorithm 315 utilizes a second machine learning algorithm with the input variables 300, the external data 302, and the weights generated by the royalty risk assessment—weighting system 310 to generate the output 305 (step 155 of FIG. 2), for example, based on previously-received training data. In some embodiments, second machine learning algorithm of the royalty risk assessment—decisioning algorithm 315 also utilizes the component pricing schedule (i.e., the output 205 of FIG. 3) generated by the component pricing software 105 as an input 300 as indicated in FIG. 1B. Although blocks 310 and 315 are shown separately in FIG. 4, in some embodiments, the second machine learning algorithm implemented by the electronic processor 605 performs the functionality of both blocks 310 and 315.

Continuing the smart camera example explained previously herein with respect to FIG. 3, the royalty pricing software 110 may receive inputs that indicate that the increase in manufacturing costs is "high" or rated to be a seven out of ten. The royalty pricing software 110 may also determine that a current royalty payment amount for investors 179 that have previously purchased the smart camera results in a 24-month recovery investment pace (i.e., the investor is estimated to recoup the amount of their purchase price through royalty payments about 24 months after purchase). Given the increase in manufacturing costs, the royalty pricing software 110 may determine an updated amount of time for recovery of investment pace (e.g., 29 months). Based on this approximately 20% increase in recovery investment pace, the royalty risk assessment—weighting system 310 may determine that the impact on future investments in the smart camera is fairly high at, for example, a six out of ten.

Given the risk weight of six out of ten, the royalty risk assessment—decisioning algorithm 315 determines that the impact to the recovery of investment pace is significant enough to increase the royalty payment amount. For example, the royalty risk assessment—decisioning algorithm 315 may determine to increase the royalty payment amount proportionality to the 20% increase recovery of investment pace to maintain the recovery of investment pace at 24 months. As an alternative to this example, if the risk weight calculated by the royalty risk assessment—weighting system 310 is determined to be a lower (e.g., a three out of ten because, for example, the impact on the recovery of investment pace is only 10% instead of 20%), the royalty risk assessment—decisioning algorithm 315 may determine that no change to the previous royalty payment amount is warranted. For example, the change of the recovery of investment pace may be compared to a predetermined threshold (e.g., 15%) to determine whether to change the previously-established royalty payment amount for the hardware resource 183.

In some embodiments, the royalty pricing software 110 is configured to compare the output 305 with the actual performance of the recovery of investment pace with respect to a hardware resource 183. For example, the royalty pricing software 110 may determine whether the investor 179 receives back all of the capital (i.e., money) they invested by purchasing the hardware resource 183 within the expected time period. The royalty pricing software 110 may also determine how long it took the investor 179 to make a profit from the purchase of the hardware resource 179 based on the actual royalty payments received, how much profit the investor 179 made with respect to the purchased hardware resource 183, and/or the like. Based on these comparisons to actual performance of the investment in the hardware resource 183, user feedback, or both, the royalty pricing software 110 may be modified to improve its performance. For example, the second machine learning algorithm may receive this information as further input data (e.g., training data) when calculating outputs 305 for the same or different hardware resources 183 in the future.

Figure 5:
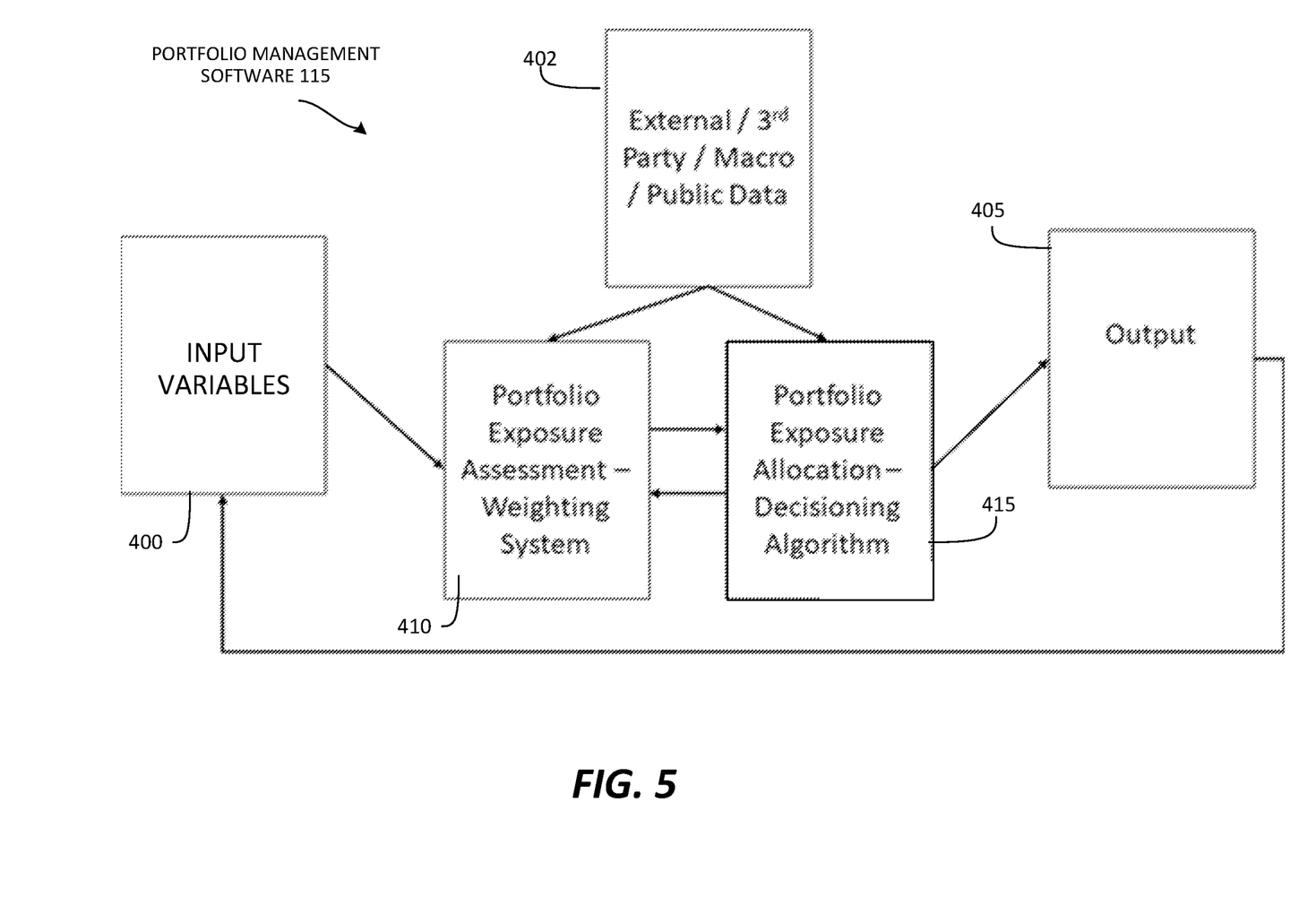
FIG. 5 is an example illustration of the portfolio risk management software of FIG. 1B in accordance with some embodiments.

FIG. 5 is an illustration of the portfolio risk management software 115 showing input variables 400 received by the portfolio risk management software 115, outputs 405 that the portfolio risk management software 115 generates when executed by an electronic processor 605, and a portfolio exposure assessment—weighting system 410 and a portfolio exposure assessment—decisioning algorithm 415 that are configured to generate the outputs 405 based on the input variables 400 and based on external data 402.

The portfolio exposure assessment—weighting system 410 may be configured to generate a plurality of weights based on the input variables 400 (step 160 of FIG. 2). The portfolio exposure assessment—decisioning algorithm 415 may be configured to utilize a third machine learning algorithm that receives the input variables 400, the external data 402, and the plurality of weights generated by the portfolio exposure assessment—weighting system 410 to generate the outputs 405 from the inputs 400 (step 165 of FIG. 2), for example, based on previously-received training data. The portfolio risk management software 115 may be configured to determine investment recommendations for an investor 179 based on a current portfolio position of the investor 179. The current portfolio position or exposure position of the investor 179 may be determined based at least partially on the royalty payments that the investor 179 is receiving from one or more hardware-based solution providers 177. The amounts of these royalty payments may be included in the input variables 400.

The input variables 400 may additionally or alternatively include an exposure position of the portfolio of the investor 179 to different industries (for example, energy, manufacturing, food, finance, and the like), an exposure position of a portfolio of the investor 179 to different types of companies (for example, start-up company versus well-established company, company without debt versus company with high amount of debt, and the like), performance of the royalty stream of the portfolio of the investor 179 (e.g., including actual royalty payments that have been received as well as future royalty payments that are expected, for example, based on the output 305 of the royalty pricing software 110), a combination of the foregoing, and the like. The external data 402 may include macro and industry specific trends from one or more databases (for example, an indication that pagers are being overtaken by cell phones for personal and professional use in telecommunications), a combination of the foregoing, and the like. In some embodiments, the external data 402 is the same as or similar to the external data 202 explained previously herein with respect to FIG. 3. For example, the external data 302 includes industry specific inputs and the like.

The outputs 405 may include a pacing recommendation for investing in a particular portfolio position (for example, a particular industry or company), an alert indicating under or over investment in a particular portfolio position, company, industry, or sector, a combination of the foregoing, and the like. In some embodiments, one or more of the outputs 405 of the portfolio risk management software 115 (for example, an industry exposure weighted score) are inputs to the component pricing software 105 and/or the royalty pricing software 110. For example, as an investor 179 invests in multiple different companies (e.g., by buying hardware resources 183), the portfolio management software 115 might determine that the investor 179 has a higher than expected exposure to a set of companies which serve the same industry or set of industries. In this case, to reduce the risk to the overall portfolio of the investor 179, outputs 405 from the portfolio risk management software 115 may cause the component pricing software 105 to determine a lesser price for hardware resources 183 related to an industry to which the investor is overexposed, cause the component pricing software 105 to determine that fewer hardware resources 183 related to the industry to which the investor is overexposed should be purchased by the investor 179, cause the royalty determination software 110 to determine a higher royalty price for hardware resources 183 related to the industry to which the investor is overexposed before recommending the purchase of such hardware resources 183 to the investor 179, a combination of the foregoing, or the like.

Continuing the smart camera example explained previously herein with respect to FIGS. 3 and 4, the portfolio risk management software 115 may receive an input (e.g., from the royalty pricing software 110) indicating that the royalty payment for the smart camera is expected to be increased in order to maintain a recovery of investment pace of 24 months. However, the purchase price of the smart camera may also be expected to proportionately increase as well (e.g., based on a received input from the component pricing software 105). The portfolio risk management software 115 may also receive an input indicating that the current allocation of the portfolio of the investor 179 to the hardware-based solution provider 177 utilizing the smart camera to provide services is 15% of the portfolio.

Given the change in royalty payment expectations, the portfolio risk management software 115 may determine that investment in the smart camera has a "medium" exposure weight of five out of ten. This determination may be made even though the recovery of investment pace is expected to remain the same at 24 months. Given the medium exposure weight of five out of ten, the portfolio risk management software 115 may stop recommending increases to the investment in the smart camera and may recommend maintaining current holdings (e.g., 15% of the portfolio) in the investment in the smart camera. As an alternative to this example, if the exposure weight of investment in the smart camera is lower (e.g., a three out of ten because the impact of cost increase on the recovery of investment pace causes an increase in the recovery of investment pace), the portfolio risk management software 115 may underweight allocations of investment in the smart camera, for example, down to 10% of the portfolio. In other words, the portfolio risk management software 115 may recommend selling some of the smart cameras to other investors 179 to reduce the allocation of investment in the smart camera in the portfolio of the first investor 179.

Figure 6:
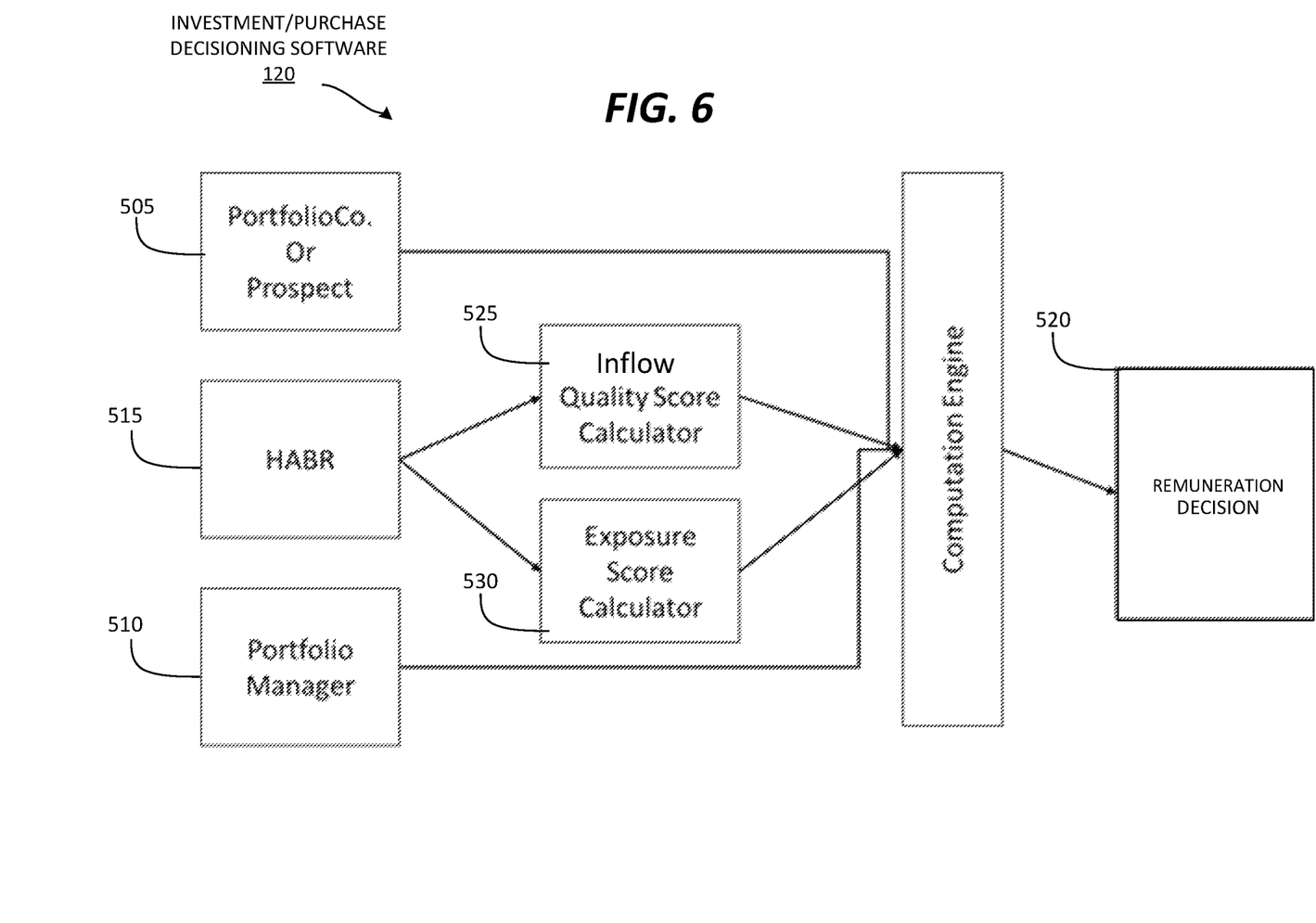
FIG. 6 is an example illustration of the investment/purchase decisioning software of FIG. 1B in accordance with some embodiments.

FIG. 6 is an illustration of the investment/purchase decisioning software 120 showing inputs 505, 510, and 515 received by the investment/purchase decisioning software 120. The inputs include an input 505 regarding a hardware-based solution provider 177 (e.g., a company already in the portfolio of the investor 179 (i.e., a "PortfolioCo.") that has additional hardware resources 183 available for purchase or a prospective company that has hardware resources 183 available for purchase but that is not included in the portfolio of the investor 179 (i.e., a "Prospect")). The inputs also include an input 510 from a portfolio manager (for example, a user or group of users in charge of managing an investment portfolio of one investor 179 or a group of investors 179). The inputs also include an input 515 from the hardware asset class implementation software 100 including expected values and recommendations that are determined by one or more of the component pricing software 105, the royalty pricing software 110, and the portfolio risk management software 115 (i.e., outputs 205, 305, 405) as described previously herein with respect to FIGS. 2-5 (i.e., hardware asset backed royalty (HABR) calculations).

In some embodiments, the investment/purchase decisioning software 120 compares inputs (e.g., input 505 regarding a hardware-based solution provider 177) from a hardware-based solution provider 177 interested in receiving capital (i.e., money) from investors 179 to current overall portfolio exposure and desired overall portfolio exposure to determine whether it is advantageous for the investor 179 initially invest or further invest in the hardware-based solution provider 177 (i.e., whether it is advantageous for the investor 179 to purchase new hardware resources 183 or additional hardware resources 183). In some embodiments, the input 505 relates to a single hardware-based solution provider 177 at a time to allow the investment/purchase decisioning software 120 to determine whether to recommend investment in hardware resources 183 utilized by the hardware-based solution provider 177 to provide services to end users 181.

The input 505 regarding the hardware-based solution provider may include current and historical financial data of the hardware-based solution provider 177, current and historical ownership and leadership information of the hardware-based solution provider 177, current and historical debt and equity relationship information of the hardware-based solution provider 177, current and historical hardware profile data (commodity/custom, sensor/device, life of the hardware resource 183 or Mean Time To Failure (MTTF), historical breakage rates—in customer/shipping, COGS/unit, etc.), current and historical industry and customer mix and target data, current and historical customer retention data, current and historical customer contracts duration, current and historical supplier(s) and/or manufacturer(s) information (for example, lead time (amount of time between order placement and delivery), sources (manufacturer and/or geographic location from which sub-components used to build the hardware resource 183 are received), and the like), current and historical operational information (time to deploy product, time to first payment post deployment, and the like), a combination of the foregoing, and the like. In some embodiments, rather than receiving historical and current information associated with a hardware-based solution provider, changes/updates for previously-stored historical and current information for the hardware-based solution provider 177 are received by the investment/purchase decisioning software 120. The input 510 from the portfolio manager may include an investor's desired levels of portfolio exposure and system overrides as input/programmed by the investor 179 or a manager of the investment portfolio of the investor 179.

When the hardware-based solution provider 177 is already receiving capital from investors 179 for hardware resources 183, paying royalties with respect to hardware resources 183, or both, input 515 from the hardware asset class implementation software 100 may include a quality score of a hardware-based solution provider's current royalty payments. The quality score of the current royalty payments may be determined by an inflow quality score calculator 525 (i.e., royalty quality score calculator) included in the hardware asset class implementation software 100 based on whether the hardware-based solution provider 177 is meeting a predetermined percentage of their total royalty payment per period (for example, year to date), whether the hardware-based solution provider is meeting a predetermined percentage of their royalty payments for each individual investor per period, pace of growth (e.g., 50+% growth from last quarter, 25%-50% growth from last quarter, 0%-25% growth from last quarter, etc.), performance of the hardware resource 183 (for example, whether it exceeds expectations, meets expectations, or does not meet expectations), performance of customer churn (for example, whether customer churn exceeds expectations, meets expectations, or does not meet expectations), a combination of the foregoing, and the like. Input 515 from the hardware asset class implementation software 100 may also include a growth rate of monthly recurring revenue (MRR) and earnings before interest, tax, depreciation and amortization (EBITDA) of the hardware-based solution provider 177, macro trends of the industry to which the hardware-based solution provider 177 belongs, a current overall exposure score representing the number of hardware-based solution providers 177 in which the investor 179 is already invested that are similar to the hardware-based solution provider 177 (for example, belonging to the similar technological industry, of a similar size, of a similar stage/age, of a similar manufacturer/country of manufacturer, of a similar country or geography, and the like), a combination of the foregoing, and the like. The overall exposure score of the investor 179 in companies similar to the hardware-based solution provider 177 being analyzed may be determined by an exposure score calculator 530 included in the hardware asset class implementation software by determining total capital (i.e., money) of the investor 179 being invested in each industry, each type of technology, each stage of company (for example, start-up or established company), each manufacturer (or country of manufacturer), each country/geography, a combination of the foregoing, and the like.

When the hardware-based solution provider 177 is already receiving capital from investors 179 for hardware resources 183, paying royalty with respect to hardware resources 183, or both, input 515 from the hardware asset class implementation software 100 may include an indication as to whether such investors 179 are contributing capital to a hardware-based solution provider 177 in the same industry, producing similar technology, at the same stage.

In some embodiments, the investment/purchase decisioning software 120 may not be provided and may not have access to some of the input information explained above. In such situations, the investment/purchase decisioning software 120 may determine a similar hardware-based solution provider 177 to which the software 120 does have access to some of the input information explained above. For example, the similar hardware-based solution provider 177 may be in the same technological industry and may be at a similar stage as the hardware-based solution provided 177 being analyzed. The input information of the similar hardware-based solution provider 177 may be used as an estimate to evaluate the hardware-based solution provider 177 for which some of the input information is not available. If such a similar hardware-based solution provider 177 is not able to be determined, the software 177 may use macro and industry specific trends from one or more databases to analyze potential investment in hardware resources 183 of the hardware-based solution provider 177.

In some embodiments, the investment/purchase decisioning software 120 compares inputs 505 from the hardware-based solution provider 177 (e.g., specifically desired size of purchase, quality of company, etc.) to current overall portfolio exposure and desired overall portfolio exposure to determine a remuneration decision (i.e., purchase decision or output 520). In some embodiments, outputs 520 of investment/purchase decisioning software 120 include recommended quantity of capital (i.e., money) to be invested in the hardware-based solution provider 177 being analyzed, minimum quantity of capital (i.e., money) to invest in the hardware-based solution provider 177 being analyzed, and calculated terms and prices to be utilized with respect to investment in the hardware resources 183 to be utilized by the hardware-based solution provider 177 being analyzed to provide services to end users 181 (for example, targeted purchase price for the hardware resources 183, targeted royalty payment amount to be received by the investor 179, targeted duration/caps of royalty payments to the investor 179 and/or from the end user 181 to the hardware-based solution provider 177, and the like). In some embodiments, the investment/purchase decisioning software 120 generates a letter of intent that includes the calculated terms and prices.

Continuing the smart camera example explained previously herein with respect to FIGS. 3-5, the investment/purchase decisioning software 120 may receive a new purchase request from a hardware-based solution provider 177 providing services with respect to the smart camera. However, the investment/purchase decisioning software 120 determines that the hardware asset class implementation software 100 previously recommended a "hold" or "maintain" exposure level for the hardware-based solution provider 177 in view of the increase in cost factors associated with manufacturing the smart camera explained previously herein.

Given the "hold/maintain" status/score, the investment/purchase decisioning software 120 may determine that if additional purchases of smart cameras are made, the allocation or exposure amount of the portfolio of the investor 179 to the hardware-based solution provider will exceed the calculated recommendation of 15%. Accordingly, the investment/purchase decisioning software 120 generates a purchase decision 520 that rejects the purchase offer from the hardware-based solution provider 177 or that recommends against additional purchasing of smart cameras from the hardware-based solution provider 177. In some embodiments, the investment/purchase decisioning software 120 may determine that due to forecasted/predicted purchase requests from other hardware-based solution providers 177 included in the portfolio of the investor 179, there is a high probability of portfolio re-balancing in, for example, thirty days. Accordingly, depending on other purchases and/or sales made within the portfolio, the purchase of additional smart cameras may be able to be made in thirty days without increasing the exposure to smart cameras over 15%. In some embodiments, a notification regarding this potential future purchase in thirty days may be provided to the investor 179 and/or the hardware-based solution provider 177.

In some embodiments, the portfolio construction software 130 and the yield customization software 125 (see FIG. 1B) allows investors 179 to generate an investment portfolio based on a plurality of criteria. For example, through a secure web interface or smart device application investors 179 or other users may select one or more industries, geographies, company stages of hardware-based solution providers 177, investment amounts, and other criteria. Based on the selections of the criteria made by the investor 179, the portfolio construction software 130 and the yield customization software 125 produces a targeted yield range. In some embodiments, the investor 179 may be able to adjust the targeted yield range (e.g., to a desired yield range) and, in response, the portfolio construction/yield customization software 125/130 may update/change the one or more industries, geographies, stages of hardware-based solution providers 177, investment amounts, and other criteria selected by the user in order to produce the desired yield range. Once the investor's selections of criteria are received, the portfolio construction/yield customization software 125/130 performs computations based on the selected criteria to construct a recommended portfolio for the investor 179. Once the recommended portfolio is generated, the investor 179 may be able to submit a request to generate capital allocations, agreement documents (e.g., letters of intent), and the like based on the recommended portfolio.

In some embodiments, to determine a target or predicted yield based on one or more selected industries, geographies, stages of hardware-based solution providers, investment amounts, and other criteria, the portfolio construction/yield customization software 125/130 uses input from the hardware asset class implementation software 100 (for example, aggregated current yield of hardware-based solution providers 177 by industry, aggregated current yield of hardware-based solution providers 177 by geography, aggregated current yield of hardware-based solution providers 177 by stage of company, and the like).

As an example of the functionality of the portfolio construction/yield customization software 125/130, an investor 179 may desire exposure to all industries except "oil and gas," may desire to invest in United States companies only, and may be indifferent to a lifecycle stage of the companies in which to invest. Accordingly, this information may be received as inputs to the portfolio construction/yield customization software 125/130. Additionally, the investor 179 may provide inputs indicating that they have one million dollars to invest and that their desired yield is 10+% annually. Based on current performance of portfolio companies that meet the input criteria of the investor 179 and after computation of associated management fees, the portfolio construction/yield customization software 125/130 may determine that the estimated yield range is 8% to 15% annually. This estimated yield range may be output to the investor 179 to allow the investor 179 to decide whether to continue with the investment in the portfolio. If desired, the investor 179 may re-enter inputs to attempt to achieve a different outcome (e.g., allow exposure to the "oil and gas" industry and/or allow investment in non-United States companies).

While the above example includes a variety of inputs and generates an estimated yield range as the output, in some embodiments, the inputs and outputs are different. For example, the input may be a desired yield to be achieved by an investor 179 within a desired timeframe, and the output may provide a number of investment options (e.g., purchases of hardware resources 183) that are expected to produce the desired yield within the desired timeframe.

In some embodiments, the portfolio construction/yield customization software 125/130 receives inputs from a portfolio manager. For example, the portfolio construction/yield customization software 125/130 may use the received inputs to determine a target yield in place of other inputs that the portfolio construction/yield customization software 125/130 receives (for example, capacity in portfolio for additional investment by industry, capacity in portfolio for additional investment by geography, capacity in portfolio for additional investment by stage of company, fee structure (a fee that the investor 179 pays to the portfolio manager), investment incentivization modifiers such as a large opportunity to deploy capital, better than expected royalty scores, and the like). In some embodiments, the portfolio manager may increase the yield for an investor 179 to encourage an investor to invest in a particular industry.

Figure 7:
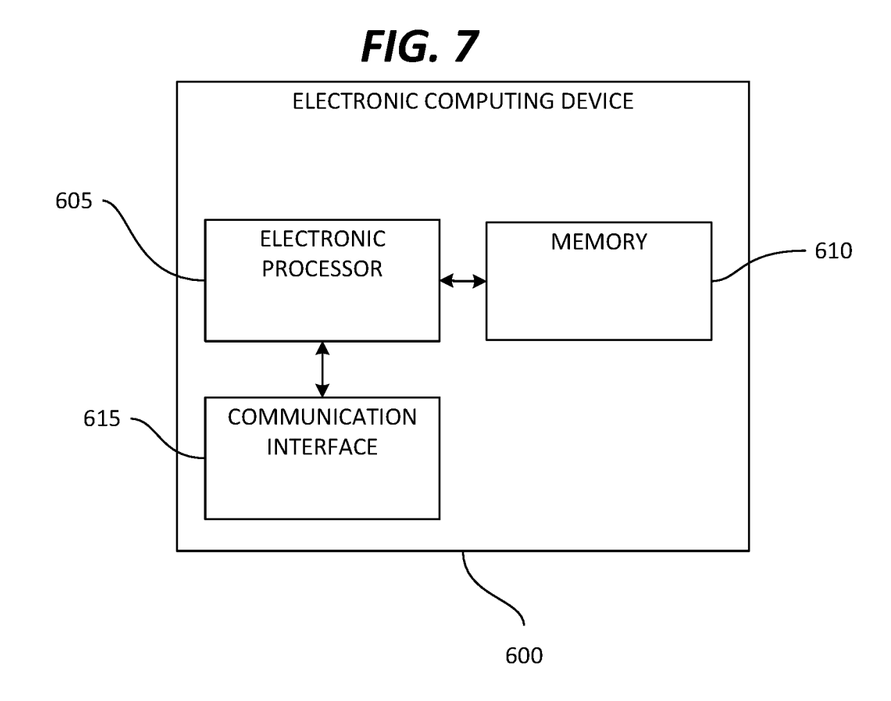
FIG. 7 illustrates an example electronic computing device for implementing the hardware resource class according to some embodiments.

In some embodiments, the portfolio construction/yield customization software 125/130 includes a spread calculator that is implemented in software by the electronic processor 605. The spread calculator may determine projected yields of a current portfolio of investments in hardware resources 183 based at least partially on exposure level of the investments in different hardware resources 183, current performance inputs of the portfolio, portfolio manager inputs, investor inputs, or a combination thereof. A management fee may be assessed on the portfolio and/or on individual investments within the portfolio, for example, by the portfolio manager. The management fee may be customizable, for example by the portfolio manager, in some embodiments.

In some embodiments, the portfolio construction/yield customization software 125/130 may include an investment incentivizer that is implemented in software by the electronic processor 605. The investment incentivizer may allow the portfolio manager to incentivize investor behavior by adjusting fees to drive potential investment in the hardware asset portfolio to desired areas. For example, the investment incentivizer may modify the yield determined by the spread calculator using an override function represented as a multiplier to the yield determined by the spread calculator.

It should be understood that the functionality described herein can be performed via one or more electronic computing devices that include one or more electronic processors. For example, FIG. 7 illustrates an electronic computing device 600 for managing investments in a hardware asset class according to some embodiments. It should be understood that, in some embodiments, the electronic computing device 600 may be part of a system that includes a plurality of electronic computing devices 600 at the same or different physical locations that communicate over one or more wired or wireless communication networks. Portions of the wireless communication networks may be implemented using a wide area network, such as the Internet, a local area network, such as a Bluetooth™ network or Wi-Fi, and combinations or derivatives thereof. In some embodiments, the functionality described herein is performed via the plurality of electronic computing devices 600 in a distributed or cloud-computing environment rather than a single electronic computing device 600.

As illustrated in FIG. 7, the electronic computing device 600 includes an electronic processor 605, a memory 610, and a communication interface 615. The electronic processor 605, the memory 610, and the communication interface 615 may communicate wirelessly, over wired communication channels or buses, or a combination thereof. The electronic computing device 600 may include additional components than those illustrated in FIG. 7 in various configurations. For example, in some embodiments, the electronic computing device 600 includes multiple electronic processors, multiple memory modules, multiple communication interfaces, or a combination thereof. As another example, one or more electronic computing devices 600 included in a system of electronic computing devices 600 may include a user input device (e.g., keyboard, touch screen, or the like) and/or a user output device (e.g., a touch screen display, a monitor, a speaker, or the like).

The electronic processor 605 may be a microprocessor, an application-specific integrated circuit (ASIC), and the like. The electronic processor 605 is generally configured to execute software instructions to perform a set of functions, including the functions described herein. The memory 610 includes a non-transitory computer-readable medium and stores data, including instructions executable by the electronic processor 605. The communication interface 615 may be, for example, a wired or wireless transceiver or port, for communicating with one or more databases and/or other electronic computing devices 600 over a communication network and, optionally, one or more additional communication networks or connections.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An electronic computing device for implementing a hardware resource class, the electronic computing device comprising:
   an electronic processor configured to
      determine a rate of a hardware resource, wherein the hardware resource is configured to allow a hardware-based solution provider to provide a service to an end user, and wherein the rate is configured to be remunerated by a source different than the end user, determine a plurality of weights for a first machine learning algorithm using first input variables associated with the hardware resource and external data related to the hardware resource;

determine an inflow amount for the hardware-based solution provider to remunerate to the source based at least partially on the rate of the hardware resource using the first machine learning algorithm; and modify the first machine learning algorithm based on user feedback, a comparison of actual performance to predicted performance, or both to update future determinations made by the first machine learning algorithm, wherein the end user utilizes the service from the hardware-based solution provider, and wherein the service from the hardware-based solution provider is at least partially based on data provided by the hardware resource.

2. The electronic computing device of claim 1, wherein the electronic processor is configured to determine the rate of the hardware resource by:

determining a plurality of weights for a second machine learning algorithm using second input variables associated with the hardware resource and the external data related to the hardware resource; and determining the rate of the hardware resource using the second machine learning algorithm.

3. The electronic computing device of claim 2, wherein the second input variables include one or more of data associated with raw material used to create the hardware resource, volume pricing discounts associated with the hardware resource, and continuing expenses of maintaining the hardware resource; and wherein the external data related to the hardware resource includes one or more of end user usage trends related to the hardware resource, industry trends related to manufacturing costs of the hardware resource, and imposed restrictions that affect manufacturing cost, shipping costs, or both of the hardware resource.

4. The electronic computing device of claim 1, wherein the first input variables include one or more of a type of industry in which the hardware resource is used by the end user, a type of contract in which the end user engages to receive the service from the hardware-based solution provider, a life expectancy of the hardware resource, a total cost of ownership of the hardware resource, financial information of the hardware-based solution provider, a stage of the hardware-based solution provider utilizing the hardware resources to provide the service, a customer churn rate for the hardware-based solution provider, a failure rate of the hardware resource, and data related to actual inflow amounts received with respect to the hardware resource or similar hardware resources.

5. The electronic computing device of claim 1, wherein the electronic processor is configured to:

receive an input variable indicating that a cost of manufacturing the hardware resource has increased;

determine that the increase in the cost of manufacturing is above a predetermined threshold; and in response to determining that the increase in the cost of manufacturing is above the predetermined threshold, increase the rate of the hardware resource.

6. The electronic computing device of claim 5, wherein the electronic processor is configured to:

determine the inflow amount for the hardware resource based at least partially on a recovery of investment pace that indicates how long after remuneration it will take the source to recover the rate of the hardware resource by receiving periodic inflow amounts each in the inflow amount;

in response to the increasing the rate of the hardware resource, determine that a change in the recovery of investment pace is above a second predetermined threshold; and in response to determining that the change in the recovery of investment pace is above the second predetermined threshold, increase the inflow amount for the hardware resource.

7. The electronic computing device of claim 1, wherein the hardware-based solution provider receives periodic remuneration from the end user in exchange for the service provided to the end user, and wherein the periodic remuneration is less than the rate of the hardware resource.

8. The electronic computing device of claim 1, wherein the electronic processor is configured to produce a portfolio recommendation regarding whether to remunerate additional hardware resources at least partially based on one or more of the rate of the hardware resource and the inflow amount.

9. The electronic computing device of claim 1, wherein the electronic processor is configured to construct a recommended portfolio of hardware resources for the source to remunerate based on a plurality of criteria including one or more of a type of industry of hardware resources, a geography in which a hardware resource is deployed or manufactured, a stage of hardware-based solution providers utilizing the hardware resources to provide the service, and an investment amount that the source is willing to invest in the hardware resources.

10. A method for implementing a hardware resource class, the method comprising:

determining, with an electronic processor, a rate of a hardware resource, wherein the hardware resource is configured to allow a hardware-based solution provider to provide a service to an end user, and wherein the rate is configured to be remunerated by a source different than the end user;

determining, with the electronic processor, a plurality of weights for a first machine learning algorithm using first input variables associated with the hardware resource and external data related to the hardware resource;

determining, with the electronic processor, an inflow amount for the hardware-based solution provider to remunerate to the source based at least partially on the rate of the hardware resource using the first machine learning algorithm; and modifying the first machine learning algorithm based on user feedback, a comparison of actual performance to predicted performance, or both to update future determinations made by the first machine learning algorithm, wherein the end user utilizes the service from the hardware-based solution provider, and wherein the service from the hardware-based solution provider is at least partially based on data provided by the hardware resource.

11. The method of claim 10, wherein determining the rate of the hardware resource includes:

determining, with the electronic processor, a plurality of weights for a second machine learning algorithm using second input variables associated with the hardware resource and the external data related to the hardware resource; and determining, with the electronic processor, the rate of the hardware resource using the second machine learning algorithm.

12. The method of claim 11, wherein the second input variables include one or more of data associated with raw material used to create the hardware resource, volume pricing discounts associated with the hardware resource, and continuing expenses of maintaining the hardware resource; and wherein the external data related to the hardware resource includes one or more of end user usage trends related to the hardware resource, industry trends related to manufacturing costs of the hardware resource, and imposed restrictions that affect manufacturing cost, shipping costs, or both of the hardware resource.

13. The method of claim 10, wherein the first input variables include one or more of a type of industry in which the hardware resource is used by the end user, a type of contract in which the end user engages to receive the service from the hardware-based solution provider, a life expectancy of the hardware resource, a total cost of ownership of the hardware resource, financial information of the hardware-based solution provider, a stage of the hardware-based solution provider utilizing the hardware resources to provide the service, a customer churn rate for the hardware-based solution provider, a failure rate of the hardware resource, and data related to actual inflow amounts received with respect to the hardware resource or similar hardware resources.

14. The method of claim 10, further comprising:

receiving, with the electronic processor, an input variable indicating that a cost of manufacturing the hardware resource has increased;

determining, with the electronic processor, that the increase in the cost of manufacturing is above a predetermined threshold; and in response to determining that the increase in the cost of manufacturing is above the predetermined threshold, increasing, with the electronic processor, the rate of the hardware resource.

15. The method of claim 14, further comprising:

determining, with the electronic processor, the inflow amount for the hardware resource based at least partially on a recovery of investment pace that indicates how long after remuneration it will take the source to recover the rate of the hardware resource by receiving periodic inflow amounts each in the inflow amount;

in response to the increasing the rate of the hardware resource, determining, with the electronic processor, that a change in the recovery of investment pace is above a second predetermined threshold; and in response to determining that the change in the recovery of investment pace is above the second predetermined threshold, increasing, with the electronic processor, the inflow amount for the hardware resource.

16. The method of claim 10, wherein the hardware-based solution provider receives periodic remuneration from the end user in exchange for the service provided to the end user, and wherein the periodic remuneration is less than the rate of the hardware resource.

17. The method of claim 10, further comprising producing, with the electronic processor, a portfolio recommendation regarding whether to remunerate additional hardware resources at least partially based on one or more of the rate of the hardware resource and the inflow amount.

18. The method of claim 10, further comprising constructing, with the electronic processor, a recommended portfolio of hardware resources for the source to remunerate based on a plurality of criteria including one or more of a type of industry of hardware resources, a geography in which a hardware resource is deployed or manufactured, a stage of hardware-based solution providers utilizing the hardware resources to provide the service, and an investment amount that the source is willing to invest in the hardware resources.

* * * * *